United States Patent
Paterson et al.

(10) Patent No.: US 9,286,166 B2
(45) Date of Patent: Mar. 15, 2016

(54) ELECTRONIC BACKUP OF APPLICATIONS

(71) Applicant: Apple Inc., Cupertino, CA (US)

(72) Inventors: Toby Charles Wood Paterson, San Francisco, CA (US); David A. Lyons, San Jose, CA (US); Julien Jacques Jalon, San Francisco, CA (US); Julien Yann Robert, San Francisco, CA (US); Pavel Cisler, Redwood City, CA (US); Yan Arrouye, Los Altos, CA (US); Robert M. Chinn, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/536,400

(22) Filed: Nov. 7, 2014

(65) Prior Publication Data

US 2015/0112942 A1    Apr. 23, 2015

Related U.S. Application Data

(63) Continuation of application No. 14/059,184, filed on Oct. 21, 2013, now Pat. No. 8,965,851, which is a continuation of application No. 13/350,699, filed on Jan. 13, 2012, now Pat. No. 8,566,289, which is a continuation of application No. 11/760,721, filed on Jun. 8, 2007, now Pat. No. 8,099,392.

(51) Int. Cl.
  *G06F 17/00*  (2006.01)
  *G06F 11/14*  (2006.01)
  *G06F 3/0484* (2013.01)

(52) U.S. Cl.
  CPC .......... *G06F 11/1448* (2013.01); *G06F 3/0484* (2013.01); *G06F 11/1458* (2013.01); *G06F 11/1469* (2013.01); *G06F 11/1451* (2013.01); *G06F 2201/84* (2013.01)

(58) Field of Classification Search
  CPC ............ G06F 11/1448; G06F 11/1451; G06F 11/1469; G06F 2201/84
  USPC ......................................................... 707/654
  See application file for complete search history.

(56) References Cited

U.S. PATENT DOCUMENTS

| | | | | |
|---|---|---|---|---|
| 5,806,078 | A  * | 9/1998 | Hug et al. | 707/999.202 |
| 6,801,229 | B1 * | 10/2004 | Tinkler | 715/853 |
| 7,024,527 | B1 * | 4/2006 | Ohr | G06F 11/1464 711/161 |
| 8,042,172 | B1 * | 10/2011 | Heithcock | G06F 11/1466 707/674 |
| 2002/0112237 | A1 * | 8/2002 | Kelts | 725/39 |
| 2004/0139396 | A1 * | 7/2004 | Gelernter et al. | 715/515 |
| 2005/0091596 | A1 * | 4/2005 | Anthony | G06F 3/04815 707/E17.01 |
| 2005/0187992 | A1 * | 8/2005 | Prahlad et al. | 707/204 |
| 2005/0228836 | A1 * | 10/2005 | Bacastow et al. | 707/204 |
| 2005/0262377 | A1 * | 11/2005 | Sim-Tang | 714/1 |

(Continued)

*Primary Examiner* — Rehana Perveen
*Assistant Examiner* — Tiffany Thuy Bui
(74) *Attorney, Agent, or Firm* — Downey Brand LLP

(57) ABSTRACT

Systems and methods are provided for storing and restoring digital data. In some implementations, a method is provided. The method includes receiving, while a current view of an application is displayed in a user interface, a first user input requesting that a history view associated with the current view of the application be displayed, retrieve data associated with the history view, determining a presentation format for the data, and displaying the history view in response to the first user input in accordance with the presentation format, the history view including data associated with at least a first visual representation of an earlier version of the current view of the application.

20 Claims, 8 Drawing Sheets

(56) References Cited

U.S. PATENT DOCUMENTS

| | | | |
|---|---|---|---|
| 2006/0101384 A1* | 5/2006 | Sim-Tang et al. | 717/104 |
| 2006/0143250 A1* | 6/2006 | Peterson et al. | 707/204 |
| 2006/0150107 A1* | 7/2006 | Leung et al. | 715/745 |
| 2006/0206547 A1* | 9/2006 | Kulkarni et al. | 707/205 |
| 2007/0266007 A1* | 11/2007 | Arrouye et al. | 707/3 |
| 2008/0059894 A1* | 3/2008 | Cisler et al. | 715/762 |

* cited by examiner

ELECTRONIC BACKUP OF APPLICATIONS

CROSS-REFERENCE TO RELATED APPLICATIONS

This application is a continuation of, and claims priority to, U.S. patent application Ser. No. 14/059,184, filed Oct. 21, 2013, entitled "ELECTRONIC BACKUP OF APPLICATIONS," now U.S. Pat. No. 8,965,851, Issued on Feb. 24, 2015, which is a continuation application of, and claims priority to, U.S. patent application Ser. No. 13/350,699, filed Jan. 13, 2012, now U.S. Pat. No. 8,566,289, Issued on Oct. 22, 2013, entitled, "ELECTRONIC BACKUP OF APPLICATIONS," which is a continuation of, and claims priority to, U.S. patent application Ser. No. 11/760,721, filed Jun. 8, 2007, now U.S. Pat. No. 8,099,392, Issued on Jan. 17, 2012, entitled, "ELECTRONIC BACKUP OF APPLICATIONS," the contents of which are incorporated herein by reference in their entirety for all purposes.

FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

SUMMARY

Systems and methods are provided for storing and restoring digital data. In general, in one aspect, a method is provided. The method includes receiving, while a current view of an application is displayed in a user interface, a first user input requesting that a history view associated with the current view of the application be displayed, retrieve data associated with the history view, determining a presentation format for the data, and displaying the history view in response to the first user input in accordance with the presentation format, the history view including data associated with at least a first visual representation of an earlier version of the current view of the application. Other embodiments of this aspect include corresponding systems, apparatus, computer program products, and computer readable media.

Implementations of the aspect can include one or more of the following features. The earlier version of the current view can include a first element, and the aspect can further include receiving, while the history view is displayed, a second user input requesting that the current view of the application be modified according to the earlier version, at least with regard to the first element and modifying, in response to the second user input, the current view of the application according to the earlier version, at least with regard to the first element. The presentation format can include an application interface that is similar to the interface provided in the current view of the application. Generating the history view of the application interface can include generating a simplified application interface. Generating a simplified application interface can include omitting metadata associated with the application interface from display. The aspect can further include generating a restored items folder in the current application and where modifying the current view of the application includes storing the first element in the restored items folder.

In general, in one aspect, a method is provided. The method includes identifying application data to store during a first backup operation, the application data including a plurality of application files and an index, storing the application data during the first backup operation, and storing a backup index, the backup index being a subset of the index. Other embodiments of this aspect include corresponding systems, apparatus, computer program products, and computer readable media.

Implementations of the aspect can include one or more of the following features. The aspect can further include initiating a second backup operation, including storing changed application data relative to the first backup operation and updating the backup index. The application can be an e-mail application.

In general, in one aspect, a system is provided. The system includes an application, the application including a user interface providing interaction with data associated with the application, a backup component configured to store backup data capturing views of the application, and a helper application, the helper application being configured to interpret the backup data in order to generate visual representations for a backup interface. The system can further include an interface coupling the backup component and the helper application, the interface providing a communication link between the backup component and the helper application such that a backup user interface can display a captured view of the application. Other embodiments of this aspect include corresponding systems, apparatus, computer program products, and computer readable media.

Particular embodiments of the subject matter described in this specification can be implemented to realize one or more of the following advantages. An intuitive interface is provided for restoring application data efficiently. Application data can be restored using a backup interface without integrating the application with a backup application.

The details of one or more embodiments of the invention are set forth in the accompanying drawings and the descrip-

DETAILED DESCRIPTION

Figure 1:
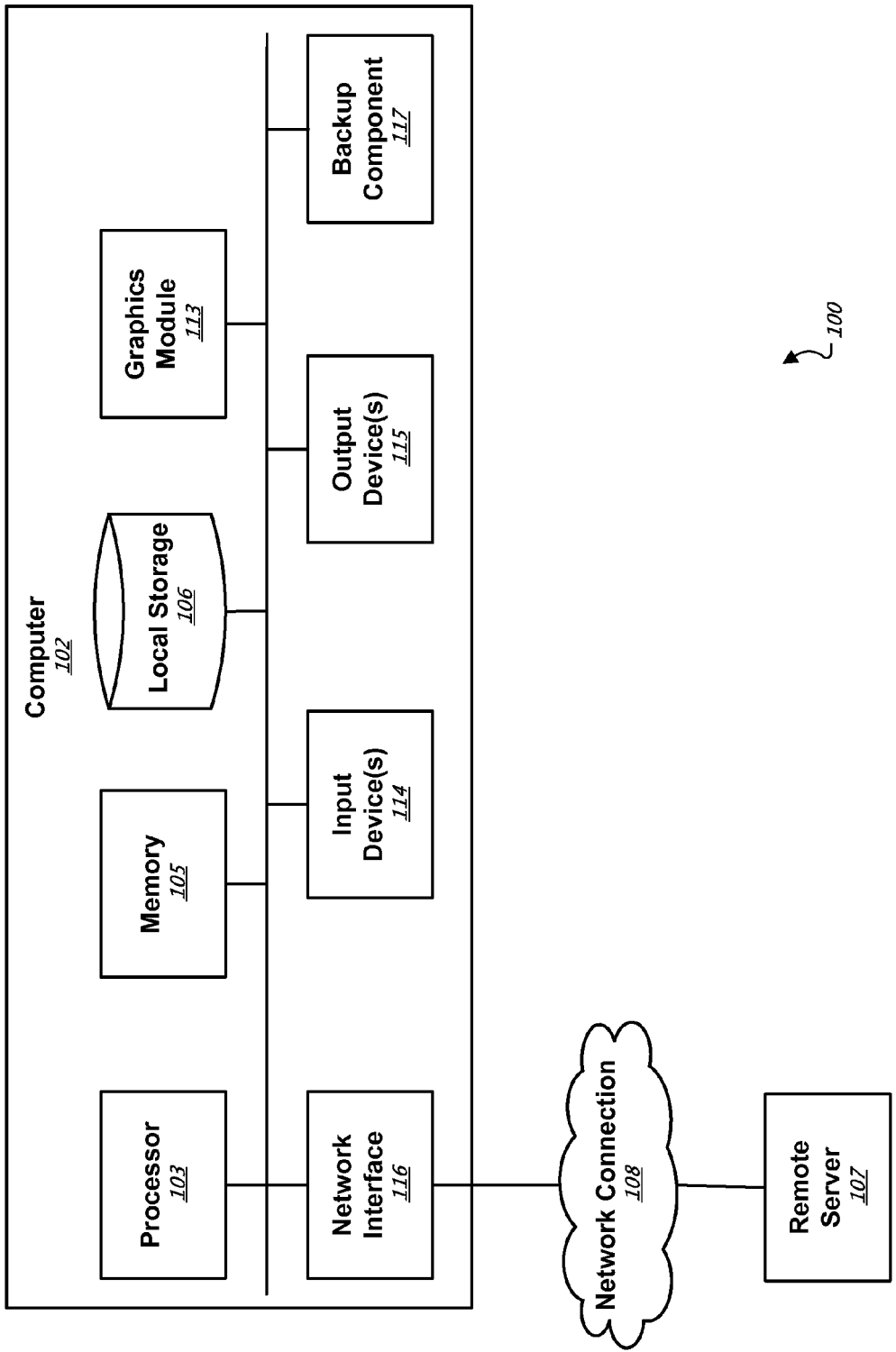
FIG. 1 is a block diagram of an example computer system.

FIG. 1 is a block diagram of an example computer system 100. The system 100 can be used for backup operations including capturing at least one earlier version of a user interface view and allowing a user to initiate a restoration based on the captured earlier version. As used herein, a view refers to an item, element or other content, capable of being presented in a user interface that can be subjected to a backup operation by a backup component 117 included in system 100. For example, a user interface view can contain any number of icons, files, folders, application state information and/or machine state information, etc.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 also includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

While modifications of a user interface view are described herein with respect to the personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). The systems and methods can be stand alone, or otherwise integrated into a more comprehensive application.

In the materials presented below, an integrated system and method for modifying a user interface view with respect to an application is disclosed. However, one of ordinary skill in the art will recognize that the engines, methods, processes and the like that are described can themselves be an individual process or application, part of an operating system, a plug-in, an application or the like.

In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, e.g., as described below. A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of backup data providing one or more versions of the computer's files or other items, for example within the local storage device 106 or in an external storage repository. In one implementation, the backup component 117 also allows a user to select any of the stored versions and use the selected version to initiate a restoration of that version in the computer 102.

Figure 2:
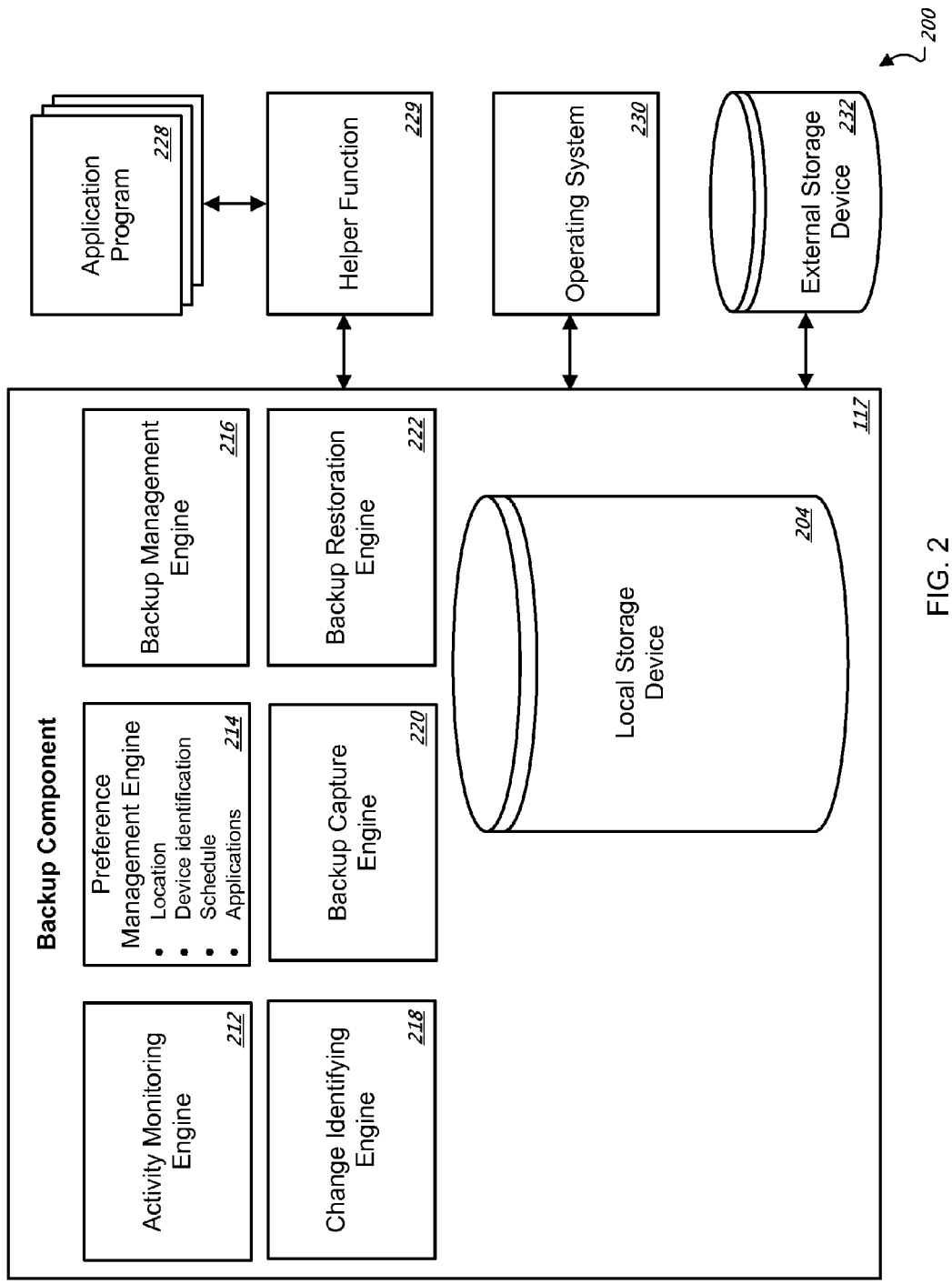
FIG. 2 is a block diagram of an example architecture for providing backup operations.

FIG. 2 is a block diagram of an example architecture 200 for providing backup operations. For example, the architecture 200 can provide for the backup and restoration of application files, such as those associated with a set of application programs 228.

Each application program 228 can use a helper function 229 to interface with a backup component 117. The helper function 229 can be, for example, a particular helper application, interface, or other code. For example, the helper function 229 can be used by the backup component 117 when generating a backup version of a current state of the application program 228. As another example, the helper function 229 can be used when the application is restored, using the backup component 117, to a state that corresponds to a backup version.

In particular, the helper function 229 can provide a graphical user interface for restoration of backup data associated with the application. For example, the helper function 229 can determine a presentation format for backup data with respect to a particular application. The presentation format can include a particular arrangement of data in a view of the application. The graphical user interface provided by the helper function 229 can present the user with a view of the application interface derived from the backup data. For example, the view of the application interface can be a visual representation having a similar or identical layout of information as is displayed by the user interface of the corresponding application program 228.

In some implementations, the helper function 229 can introduce features into the application programs 228, such as an icon or menu option for accessing the restoration functions of the backup component 117. This could be done, for example, through an application programming interface ("API") or service provider interface ("SPI") associated with each application program 228.

In one implementation, the backup component 117 provides backup and restoration capability for the system 100. Many different items or elements can be the subject of a backup operation. For example, folders, files, items, information portions, directories, images, system parameters, playlists, address books, e-mails, e-mail folders, a state of an application or state of the system, preferences (e.g., user or system preferences), and the like all can be candidates for inclusion in an archive as backup data. Other types of data can also be included as backup data.

In some implementations, the backup component 117 can include a local storage device 204 and an external storage device 232. The backup data from a backup operation can be stored on either or both. Any number of local and/or external storage devices can be used by the backup component 117 for storing backup data. In one implementation, no local storage is provided. In one implementation, the backup component 117 stores the backup data in a format corresponding to a file system structure. In one implementation, the backup component 117 runs as a background task on an operating system 230 that is not visible to the user. The backup component 117 can be capable of running across multiple user accounts.

The backup component 117 can interact with one or more of the application programs 228 using one or more helper functions 229. In one implementation, the interaction between the backup component 117 and the helper functions 229 can provide backup operations of application files, state or other items. Additionally, the interaction can provide for user restoration of particular backup data, for example, restoration of a particular application state from an earlier point in time.

The backup component 117 includes an activity monitoring engine 212. In one implementation, the activity monitoring engine 212 monitors for changes within applications (e.g., application files or state) that are targeted for inclusion in backup operations. A change can also include the addition of new files or other data structures, or deletion of existing ones.

In one implementation, the activity monitoring engine 212 is capable of discerning between a substantive change (e.g. the text within a document has been modified) and a non-substantive change (e.g. the play count within an iTunes playlist has been updated, or several changes cancel each other out). The activity monitoring engine 212 can, for example, create a list of modified elements (e.g., application files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of performing backup operations, the storage location for the backup data (e.g., file data, change data associated with a particular version of a file), the types of elements (e.g., files or other items) that are eligible for inclusion in the backup operation, and the events which trigger a backup operation (periodic or event-driven, etc.).

The preference management engine 214 can also, in some implementations, contain user specifications and/or default application parameters associated with the restoration of items.

In one implementation, the preference management engine 214 can detect that a new storage device is being added to the system and prompt the user whether the new storage device should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of views performed by the backup component 117. For example, the backup management engine 216 can trigger the activity monitoring engine 212 to monitor for activities that satisfy requirements specified in the preference management engine 214.

A change identifying engine 218 locates specific element (e.g., files or other items) to determine if data associated with the elements has changed. The change identifying engine 218 can be capable of discerning a substantive change from a non-substantive change, similar to the example described above for the activity monitoring engine 212. In one implementation, the change identifying engine 218 traverses a target set of elements (e.g., files or other items), comparing a previous version to the current version to determine whether or not a modification has occurred.

A backup capture engine 220 locates views (e.g., elements, files or other items) that are to be included in backup operations. The backup capture engine 220 can invoke the activity monitoring engine 212 and/or the change identifying engine 218, for example, to generate a capture list identifying data to be included in a next backup operation. The backup capture engine 220 can then store copies of listed data in one or more targeted storage repositories. The backup capture engine 220 can track multiple versions of elements or items included in the backup repository.

In some implementations, the captured view includes data and format information. However, in other implementations, the data included in the view (e.g., for one or more applications) does not include a presentation format for the data. For example, capturing a view of a mail application can include capturing data associated with message content, mailboxes, and the like. The presentation format information, however, can include the layout of the mail interface (e.g., an arrangement of mail messages, an order for mailboxes, a placement of icons in the interface, etc.). Consequently, the backup component can use the helper function 229 to determine a correct presentation format for the backup data of the application.

In some implementation, the backup data associated with an application does not completely match the application data. For example, particular applications (e.g., an e-mail application) can include a number of application data files (e.g., representing mailboxes and messages) as well as an index file associated with the application data files. The index file is used to quickly access information from the application data files, for example, to generate the user interface for the application.

The index can also identify various metadata associated with the applications files. For example, each message in an e-mail application can include metadata. The metadata can identify, for example, whether or not the e-mail message has been read or whether the message is flagged. The index file uses this information when generating the user interface for the e-mail application (e.g., so that a message is correctly displayed as unread). In some implementations, the backup capture engine 220 stores the application data files along with a backup index. The backup index can contain a subset of the information contained in the index. For example, the backup index can omit the metadata associated with the application files. During subsequent backup operations, the backup index can be updated along with the storage of changed application data.

The backup component 117 includes a backup restoration engine 222 to restore previous versions of views (e.g., files or other items) of an application. In some implementations, the backup restoration engine 222 restores particular data associated with the previous version of the view to the original location of the data in the file system. For example, a restored file can be restored to the particular path in the file system that the file was located when originally included in the backup data during an earlier backup operation.

In some alternative implementations, the restored data is stored in an alternative location. For example, a restored file can be stored in a "restored" folder in the file system or associated with a particular application in order to simplify a user's later retrieval of the restored file.

In one implementation, the backup restoration engine 222 provides a backup interface (e.g., a graphical user interface) where a user can select the item(s) to be restored. The user interface can provide visual representations of one or more previous views (e.g., of the application interface at a particular point in time) that the user can navigate and select from. In some implementations, the helper function 229 can provide components of the user interface used for restoration purposes. For example, the helper function 229 can generate the visual representations of previous views of an application user interface using the backup data of the backup component 117. For example, for some application programs 228, the helper function 229 can use the information in the backup index to generate the visual representations. The visual representations can then be displayed in the backup interface.

Figure 3:
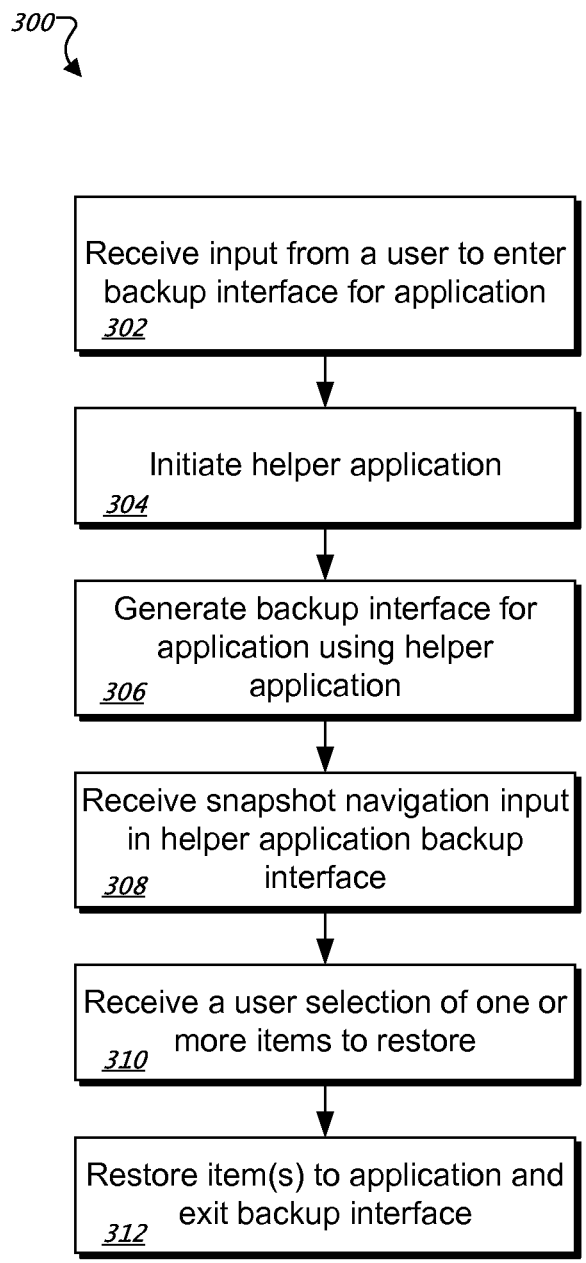
FIG. 3 is a flow diagram of an example method illustrating a use of a backup component with a particular application.

FIG. 3 is a flow diagram of an example method 300 illustrating a use of a backup component with a particular application. For convenience the method 300 will be described with respect to a system (e.g., system 100) that performs the method 300. The system receives (302) input from a user to initiate backup interface for a particular application (e.g., an e-mail application). Within the application, in some implementations, an icon, menu option, or other selection tool can exist to initiate the backup interface. In other implementations, the backup interface can be activated from outside the user application, for instance through the computer's operating system.

The system initiates (304) a helper application (e.g., the helper function 229). The helper application can be initiated, for example, by the application once the input to initiate the backup interface has been received. Alternatively, the helper application can be triggered by the backup component (e.g., backup component 117) after determining that the helper application can be used to provide the backup interface for the application. In some implementations, the helper application communicates between the application and the backup component to provide a backup interface. For example, the helper application can be configured to more efficiently access backup data identified in the backup index than the backup component.

For example, the helper application can determine a presentation format for backup data associated with the application, which may not have been captured by the backup capture engine (as described above). In some implementations, the helper application is specific to a particular application and includes information associated with the presentation format for that application. Alternatively, the helper application can be used for several applications. As a result, the helper application can determine the presentation format in a number of ways. The presentation format can be provided by the application. In some implementations, the application can provide a simplified presentation format. Alternatively, the presentation format can be determine using the backup data including one or more cues in the data, time stamp information associated with the data, according to input received by the user (e.g., user selection of an application), inferred by the type of data (e.g., document extensions associated with particular applications, version information), metadata associated with the backup data.

In some implementations, the helper application can process the presentation format information to derive a similar, but simplified presentation format to use when presenting backup data. In other implementations, the presentation format allow the helper application to generate a visual representation that resembles the visual representation provided by the application interface, which can be populated with backup data to present a particular history view of the application.

The system generates (306) the backup interface for the application using the helper application. In some implementations, the helper application generates the backup interface using information from the backup component according to a particular presentation format. In other implementations, the helper application can provide input to the backup component which then generates an appropriate backup interface for the application. The helper application can use backup data, e.g., a backup index, for a particular application in order to generate visual representations of the application for the backup interface. For example, the helper application can use the backup data and the presentation format in combination to generate one or more visual representations providing a history view of the application.

The backup interface provides a visual means for accessing and restoring items (e.g., files, folders, etc.) associated with the application. In some implementations, the backup interface provides a visual representation of a view of the application user interface similar in layout to the user interface of the application. For example, the backup interface generated for an e-mail application can provide access to previous versions of folders, messages, address book contacts, and other items associated with the email application.

The system receives (308) navigation input through the backup interface. The navigation input allows a user to identify particular items in a given view as well as navigate between different views of the application from previous backups. In some implementations, the visual representations presented in the backup interface from a particular backup operation are referred to as snapshots.

As used herein, a snapshot refers to a backup element stored in a historical archive that includes a backup of selected items or content as specified by the backup component. For example, a user can navigate to a particular snapshot in time through entering a date within the backup interface or by using a tool such as a scroll bar or directional arrows to navigate between snapshots. In some implementations, the backup interface provides a stack of snapshots of the application user interface, each snapshot proceeding backwards in time within the stack. Once a particular snapshot has been selected, in some implementations, a listing or graphical representation of the items available within that snapshot is displayed within the backup interface.

For example, a snapshot of an e-mail application display can provide a visual representation of the e-mail folders (e.g., an inbox) at a specified point in time. The visual representation of the e-mail user interface can have a similar structure of graphical elements as in a current view of the e-mail user interface. The user can identify data (e.g., a folder or individual message) from the snapshot to restore. In some implementations, the visual representation of the application user interface can be a simplified version of the actual e-mail user interface. For example, the simplified version can omit particular elements found in the user interface of the application. For example, the simplified version can omit metadata (e.g., message metadata).

The system receives (310) a selection of one or more items to restore from a selected snapshot. Exemplary methods of item selection may be to click and drag graphical items, individually type in the name of each item, highlight items using a selection tool, or other input methods of selecting members from a group of items. For example, the user can restore any or all contents or data associated with the e-mail application, such as data associated with an inbox folder, a sent items folder, a deleted items folder, an address book, calendar, preferences, or any other data of the e-mail application.

For example, the user can restore inbox messages that were permanently deleted from the e-mail application. The user can select a snapshot that includes the deleted inbox messages. In one implementation, the user can restore the entire inbox from that snapshot. Alternatively, the user can select only particular inbox messages to restore using the backup interface. Similarly, the user can restore deleted message from other folders as well as contact information that was deleted. Once items have been selected, an additional input such as a restore button or command can activate the restoration.

The system restores (312) the selected items and exits the backup interface. The helper application can facilitate communication with the backup component to transfer the data associated with each selected item from the backup component to the application. In some implementations, the item is restored to its original location within the application. For example, the item can be restored to the same path location in the file system hierarchy as at the time of the backup operation that captured the selected item.

Alternatively, in some implementation, the item can instead be restored to a special location. For example, a folder labeled "restored" can be generated for housing restored application data. In one example, a restore folder can provide the user with a convenient method of locating the items which have been restored. For example, a restored items folder in an e-mail application can allow a user to easily find the restored items. The items can later be moved to another location (e.g., to another mail folder). In some implementations, the restored folder for the application can be generated in response to a restore operation. For example, the helper application can instruct the application to generate the restored folder within the application file structure.

In some implementations, the storage location for restored items may be designated within user preferences. The preference management engine 214, for example, could be used to identify a restoration storage means.

Once restoration has been completed, the backup interface closes. In some implementations, the backup interface automatically exits upon completing a restoration task. In other implementations, the user can trigger the backup interface to close. For example, the user may select an exit button within the backup interface to close the backup interface. In some implementations, closing the backup interface returns the user to the user interface for the application (e.g., as provided in a desktop user interface).

Figure 4:
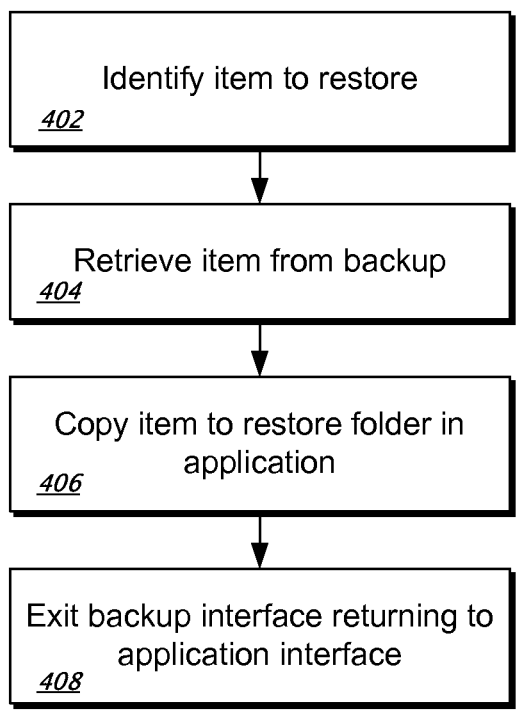
FIG. 4 is a flow diagram of an example method illustrating a backup restoration scenario.

FIG. 4 is a flow diagram of an example method 400 illustrating an backup restoration scenario. For convenience the method 400 will be described with respect to a system that performs the method 400. The system receives (402) identification of one or more items to restore through the backup interface. The items can be selected, for example, by a user navigating snapshots of backup data. In some implementations, the backup items can be identified using snapshots providing visual representations of an application user interface. The application user interface provided by the snapshots can be similar to the user interface of the actual application. In one example, the snapshots presented can provide a visual representation of a user interface for an e-mail application. The user can select email folders, messages, or other data from within the snapshot representation of the e-mail application.

Once the items have been selected for restoration, the system retrieves (404) the items from the stored backup data. For example, the backup restoration engine 222 can locate and retrieve the items for restoration. In some implementations, the stored items are created from more than one file component. For example, an email message can be comprised of textual, graphical, audio, and metadata information. Each type of data may be separately stored as different file element which, combined, provide the contents of an email message. In this case, all of the elements associated with the selected item may be located and restored together.

The system copies (406) the retrieved item to a "restore" location (e.g., a folder) in the application. In some implementations, if a folder labeled "restore" does not already exist, the "restore" folder can be created by the application in response to a request from the backup component, or alternatively, from the helper application. The user can then navigate to the "restore" folder (e.g., within the user interface of the application), and access or move the item to a desired location.

The backup component, in some implementations, can restore the selected items to their original locations. Restoring an item to its original location can, in some circumstances, require the recreation of the hierarchical structure it existed beneath. For example, if an address contact within an e-mail application were stored within "services", and the "services" directory no longer existed, the backup component would first create the "services" directory.

Once the restoration process is completed, the backup interface exits (408), returning the user to the application interface. In some implementations, the user can execute multiple restoration activities during the same backup interface session. For example, a user may wish to restore an e-mail message from a July 1 snapshot and an address book contact from a July 10 snapshot. In some implementations, the user is provided with an exit mechanism such as a "done" button to signal that the backup interface session can end.

Figure 5:
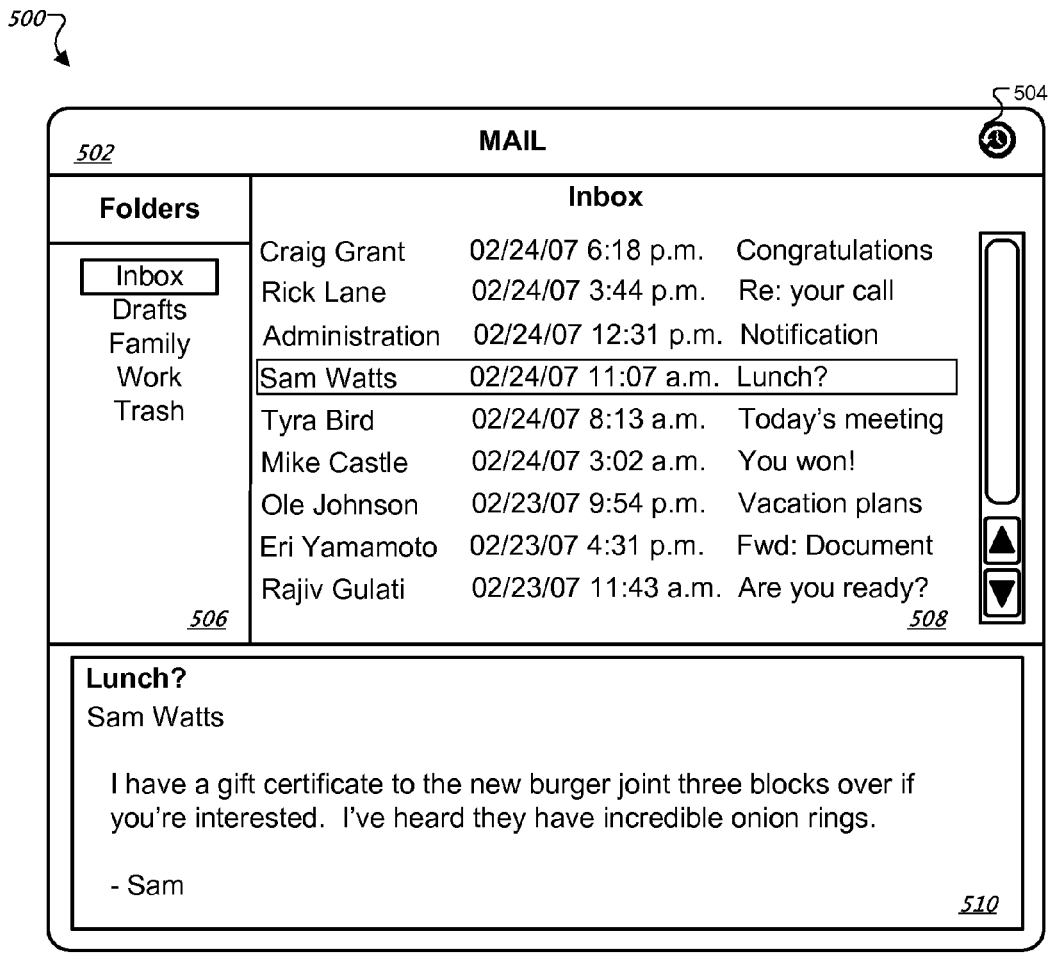
FIG. 5 is a screen shot depicting an example e-mail application user interface.

FIG. 5 is a screen shot depicting an example e-mail application user interface 500. As shown in FIG. 5, the e-mail application user interface 500 displays contents of the user's inbox including a listing of one or more received messages. The e-mail application capabilities can include but are not limited to sending and/or receiving digital content (e.g., mail messages), generating digital content, storing contact information within an address book, providing calendar data, task lists, and the like. The e-mail application user interface 500 includes a list of folders 506, a folder contents display 508 displaying content from a selected folder from the list of folders 506, and a message content frame 510. The e-mail application user interface 500 can display additional information about folder contents in the folder contents display 508. For example, if the selected folder is an inbox and the folder content displayed is a list of messages included in the inbox, metadata associated with individual messages can be displayed. The metadata information can include a state of the message (e.g., read, unread) as well as whether or not the message is flagged.

The backup component can be activated to back up content within the email application or another application, as described previously. In one implementation, the user can activate a backup interface session from the e-mail application menu bar 502 using a user-selectable icon 504. In one example, the backup interface can be activated from the application menu bar 502 e.g., as a drop-down menu option.

An options menu in the application can include backup options allowing a user to specify application data to include in particular backup operations. For example, in an e-mail application, the user can identify which content to include in the backup operations (e.g., all messages, individual message folders, address book, etc.). In some implementations, the user can generate a restore folder where restored data can be copied during restore operations using the backup interface.

The user can enter the backup interface to recover items from the e-mail application including messages, folders, and address book contacts that previously existed, but are now missing from the email application. For example, the user can have made at least one backup of the missing messages at an earlier date, and can enter the backup interface to search for the missing messages in a backup snapshot of the e-mail application allowing for the restoration of the missing messages as described above.

In some implementations, the user can choose to enter the backup interface directly from an operating system menu. In some implementations, the backup component can include several icons or menus available in other locations within the user interface 500 or running applications, thereby providing several options for activating or launching the backup interface.

Figure 6:
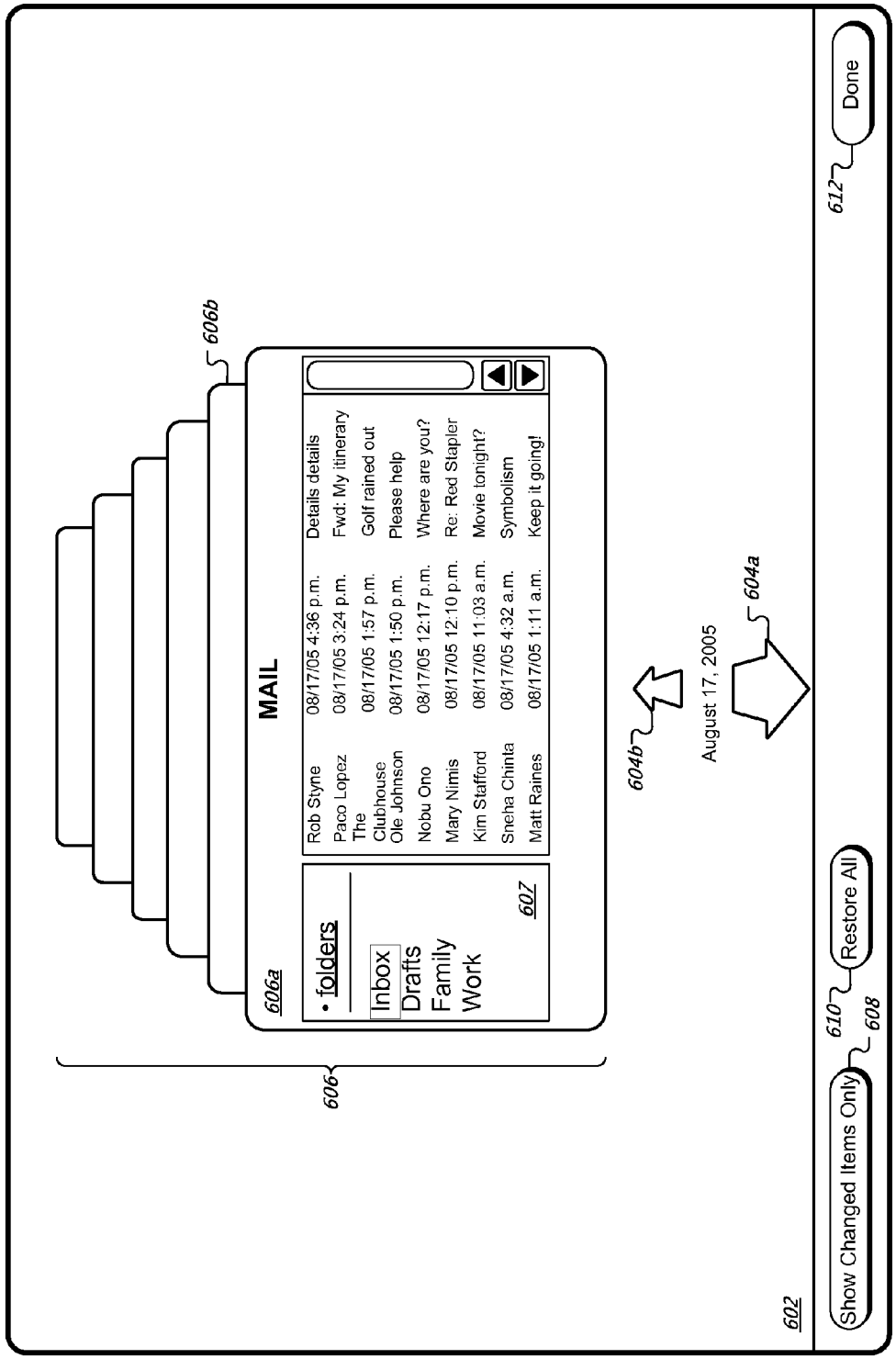
FIG. 6 is a screen shot depicting an example of an initial state for a backup interface after the backup component has been activated.

FIG. 6 is a screen shot depicting an example of an initial state for a backup interface 600 after the backup component has been activated. The backup interface 600 includes a presentation window 602 and one or more function buttons. As shown, the presentation window 602 is displaying the email application contents from FIG. 5 as they had existed in particular backup snapshots 606. A current snapshot 606a shows the user interface of the e-mail application corresponding to a snapshot taken on Aug. 17, 2005. The current snapshot 606 can, in some examples, be a default selection such as the most recent snapshot captured. The snapshots 606 can be presented using a helper application that uses information from the application and the backup component to generate a snapshot that represents the user interface of the application. For example, the helper application can use information in a backup index stored by the backup component in order to identify the data for building the user interface of the application in the backup interface. When the backup index includes less information than the application interface (e.g., by omitting metadata), the generated user interface can be simplified accordingly.

As shown in FIG. 6, the current snapshot 606a contains a simplified version of the contents of an email application's user interface. For example, there is no display segment to view the contents of an individual message, such as the content frame 510 (FIG. 5). Additionally, a list of folders 607 does not include a "Trash" folder that exists in the e-mail application user interface of FIG. 5. In some implementations, the trash contents are not included in the backup operations, and therefore are not presented in the snapshots. In some implementations, exclusion of the "Trash" folder from the email application backups can be a default setting or user specified. In some implementations, the backup interface can present the email application contents exactly as it is portrayed within the email application.

In this particular example, the snapshots are presented in a cascading stack, where the snapshots extend backwards in time. A snapshot 606b represents a snapshot captured prior to the Aug. 17, 2005 snapshot 606a. If the user selects snapshot 606b, snapshot 606b moves to the front of the stack so that the contents of snapshot 606b can be viewed.

In some implementations, the user can select items or content within the snapshots 606. For example, the user can select the snapshot 606a, and next select one or more messages and/or folders to back up using the backup interface 600. In addition, the same selection functionality can be used in previous snapshots, such as snapshot 606b, to restore missing data to the state associated with the e-mail application user interface shown in FIG. 5.

The cascade stack can contain any number of snapshots 606 representing earlier views of the e-mail application that have been stored according to previous backup operations. Each snapshot provides a screenshot representation of an earlier version of the e-mail application at a particular point in time. In some implementations, only a specified number of snapshots are shown in the stack at any given time, however, the user can navigate to snapshots beyond those shown.

The backup user interface 600 can also include function controls. For example, the backup user interface 600 can include arrow buttons 604a and 604b to navigate the snapshots forward or backward in time. Arrow buttons 604a and 604b can allow the user to navigate to additional snapshots not shown in the presentation window 602, thus there can be a large number of snapshots from which to select.

In one implementation, a "show changed items only" button 608 filters the snapshots to show only those that differ from each other and/or from the current state. In one implementation, the button 608 does not refer to the incremental changes between snapshots, but rather when invoked acts to omit those snapshots whose states are identical to the current state of the email application from presentation in the presentation window 602. For example, if the selected snapshot 606a is identical to the snapshot 606b that occurs earlier in time, selecting the changed items only button 608, in one implementation, causes the backup interface to cease displaying one of these versions, e.g., by removing the snapshot 606b from the timeline. This can help the user to view only snapshots that contain changes to the current version.

The backup interface 600 can also include a "restore all" button 610 that, when selected, restores the view to the selected state represented by the selected snapshot. In some implementations, this terminates the session of the backup interface 600. A user can alternatively select one or more individual elements in a snapshot and then select the restore button 610 to modify the current version of the element selected (e.g., restore the state of the view). For example, in an e-mail application, the user can select a few messages to restore, and this can trigger the restore button 610 to display a more precise message, such as "restore selection only."

A "done" button 612 can be selected to exit the backup interface 600 and return the user to the current view of the application user interface, for example the e-mail application described in FIG. 5. In some implementations, the backup interface 600 can automatically close upon restoration of a particular snapshot or portion thereof. In some implementations, the user can minimize the backup interface for purposes of navigating to other applications, such as an e-mail application or a web browser.

Figure 7:
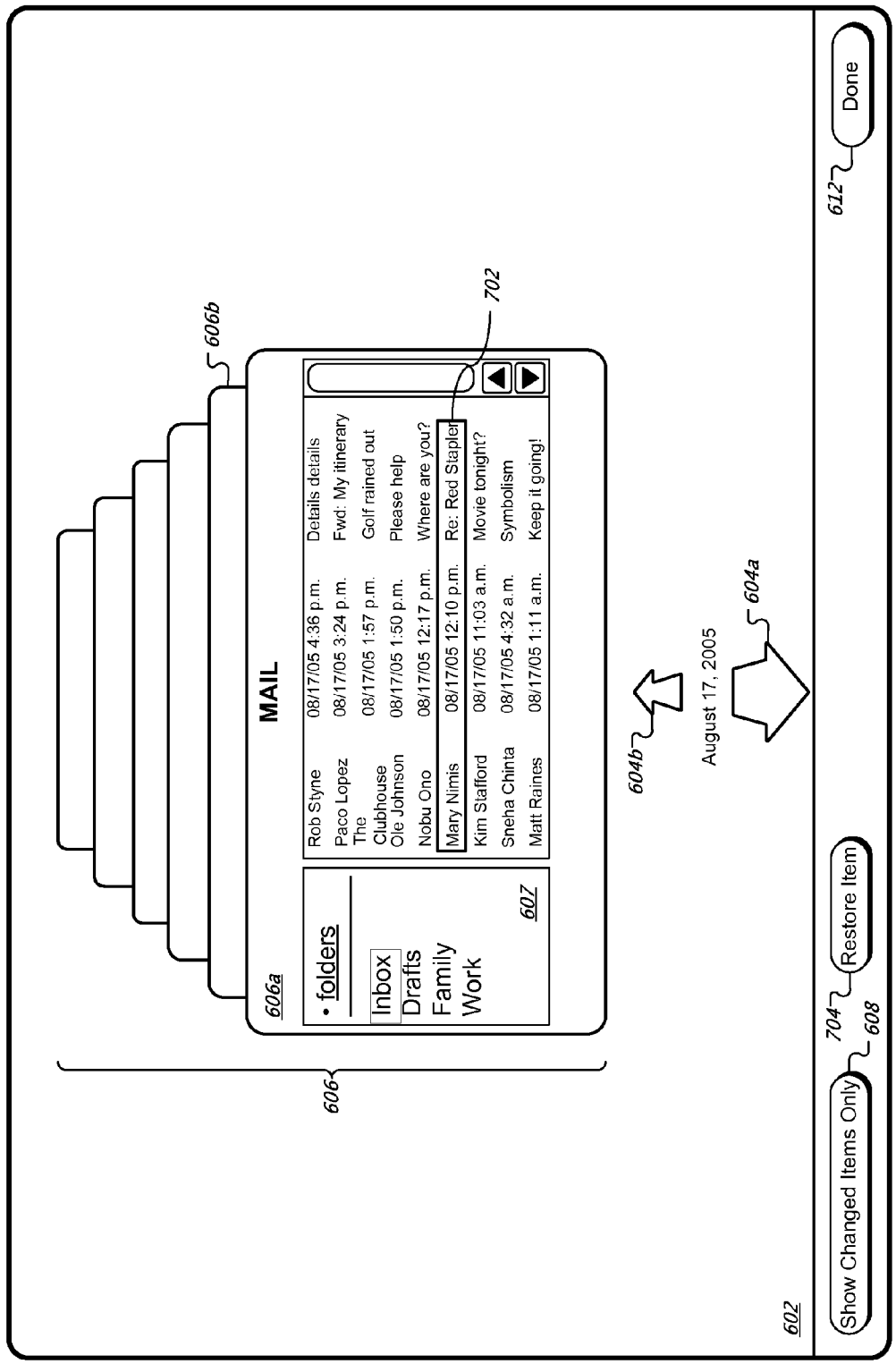
FIG. 7 is a screen shot depicting the backup interface of FIG. 6 where an item of a snapshot has been selected for restoration.

FIG. 7 is a screen shot depicting the backup interface of FIG. 6 where an item of a snapshot has been selected for restoration. For example, the user may enter the backup interface 600 to find a missing item (e.g., a missing e-mail message). As shown in FIG. 7, a message 702 has been selected within the snapshot 606a. Upon selecting the missing message 702, in some implementations, the restore button can change, as shown, from "Restore All" button 610 (FIG. 6) to a "Restore Item" button 704. If the user selects the "Restore Item" button 704, the selected message will be restored to the current e-mail application.

In some implementations, after selecting the restore button 704 the backup interface can exit and return the user to the current view of the e-mail application user interface. In some implementations, the user can choose to remain in the backup interface application to perform further restorations (e.g., from different snapshots). When the user has completed this restoration session, the done button 612 can be selected to return the user to the e-mail application user interface.

Figure 8:
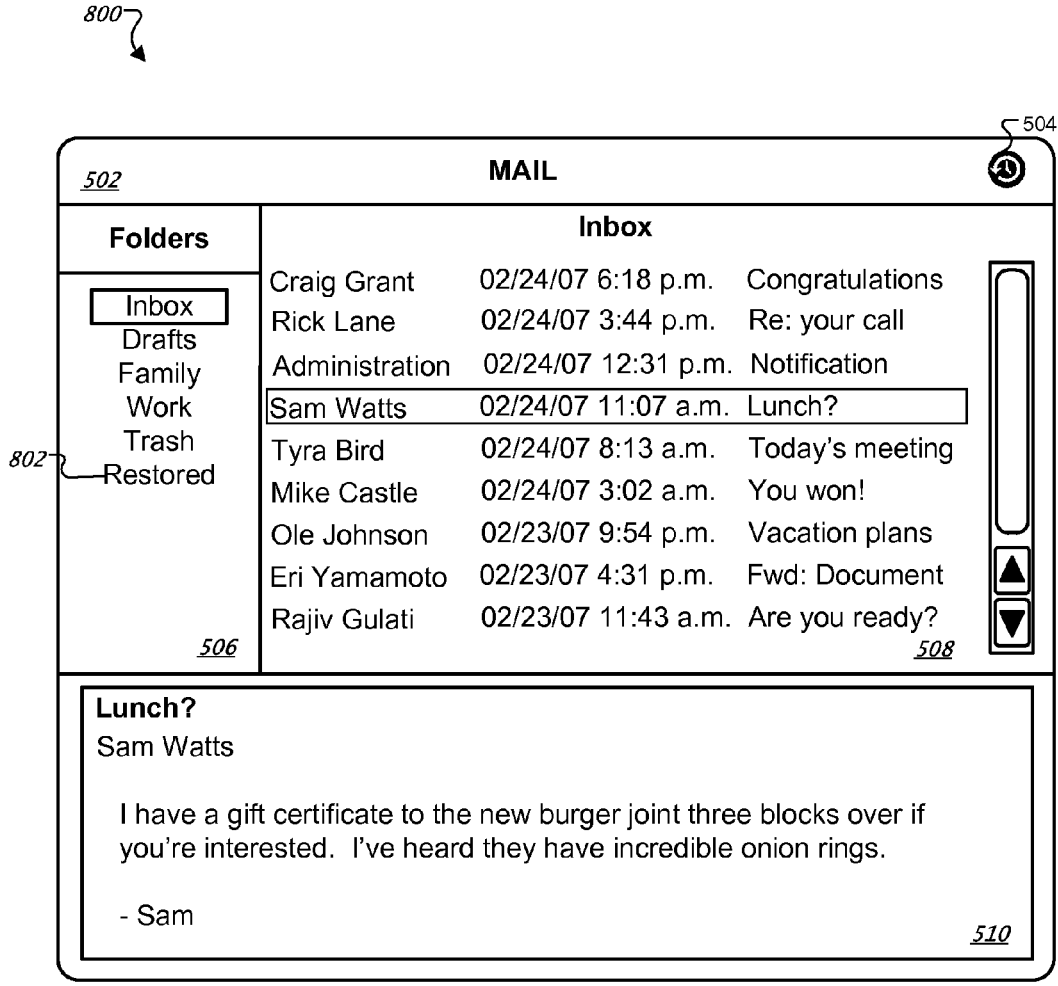
FIG. 8 is a screen shot showing the e-mail application after some contents from a snapshot have been restored using the backup interface.

FIG. 8 is a screen shot showing a current view of the e-mail application user interface 800 after some contents from an earlier version have been restored using the backup interface. As shown, a "Restored" folder 802 is now included within the application folders 506. The restored items can be found within the "Restored" folder 802. In some implementations, the application can generate the "Restored" folder 802 the first time an item is restored using the backup interface. The user can move the restored e-mail message from the "Restored" folder to another folder in a similar manner as any other e-mail message.

In another implementation, the backup interface can be used to present backup information associated with a messaging application. For example, the user can enter the backup interface to restore one or more deleted friends from a "buddy list", deleted conversations, preferences, and the like. Similarly, other applications can be presented in the backup interface in a similar manner using helper applications.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing data including electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous. Other variations are within the scope of the following claims.

What is claimed is:

1. A method comprising:
   at a backup module of a computing device:
      providing a list of restore points of an application, wherein each restore point of the list of restore points is associated with an interface of the application at a time the restore point was generated, and the interface of the application corresponds to a stored state of the application;
      receiving a first selection of a particular restore point from the list of restore points;
      displaying, in response to the first selection of the particular restore point, the interface of the application associated with the particular restore point;
      receiving a second selection of a file that is identified in the interface of the application associated with the particular restore point;
      receiving a third selection to restore the file, wherein the third selection identifies a destination folder to which the file is to be restored, and the destination folder is accessible to an active version of the application; and
      restoring the file to the destination folder.

2. The method of claim 1, wherein the interface of the application includes a list of files.

3. The method of claim 2, wherein the list of files is different than the list of restore points.

4. The method of claim 1, wherein the file includes a document or a folder.

5. The method of claim 1, further comprising:
   displaying the interface of the application and a date associated with the interface of the application.

6. The method of claim 1, wherein receiving the third selection includes a dragging operation in which a first icon representing the file is dragged to a second icon representing the destination folder.

7. The method of claim 1, wherein the interface of the application includes a time stamp corresponding to the file.

8. A non-transitory machine-readable medium storing instructions that when executed by a processor in a computing device cause the computing device to perform steps that include:
   providing a list of restore points of an application, wherein each restore point of the list of restore points is associated with an interface of the application at a time the restore point was generated, and the interface of the application corresponds to a stored state of the application;
   receiving a first selection of a particular restore point from the list of restore points;
   displaying, in response to the first selection of the particular restore point, the interface of the application associated with the particular restore point;
   receiving a second selection of a file that is identified in the interface of the application associated with the particular restore point;
   receiving a third selection to restore the file, wherein the third selection identifies a destination folder to which the file is to be restored and the destination folder is accessible to an active version of the application; and
   restoring the file to the destination folder.

9. The non-transitory machine-readable medium of claim 8, wherein the interface of the application includes a list of files.

10. The non-transitory machine-readable medium of claim 9, wherein the list of files is different than the list of restore points.

11. The non-transitory machine-readable medium of claim 8, wherein the file is a document or a folder.

12. The non-transitory machine-readable medium of claim 8, wherein receiving the third selection includes a dragging operation in which a first icon representing the file is dragged to a second icon representing the destination folder.

13. The non-transitory machine-readable medium of claim 8, wherein the steps further include:
   displaying the interface of the application and a date associated with the interface of the application.

14. A computing device, comprising:

a processor; and a memory storing instructions that when executed by the processor, cause the computing device to perform the steps of:

providing a list of restore points of an application, wherein each restore point of the list of restore points is associated with an interface of the application at a time the restore point was generated, and the interface of the application corresponds to a stored state of the application;

receiving a first selection of a particular restore point;

displaying, in response to the first selection of the restore point, the interface of the application associated with the particular restore point;

receiving a second selection of a file that is identified in the interface of the application associated with the particular restore point;

receiving a third selection to restore the file, wherein the third selection identifies a destination folder to which the file is to be restored, and the destination folder is accessible to an active version of the application; and restoring the file to the destination folder.

15. The computing device of claim 14, wherein the interface includes a list of files.

16. The computing device of claim 15, wherein the list of files is different than the list of restore points.

17. The computing device of claim 14, wherein the interface of the application includes folders.

18. The computing device of claim 14, wherein the steps include:

displaying the interface of the application and a date associated with the interface of the application.

19. The computing device of claim 14, wherein receiving the third selection includes a dragging operation in which a first icon representing the file is dragging to a second icon representing the destination folder.

20. The computing device of claim 14, wherein the file that is identified in the interface of the application is a document or a folder.

* * * * *